United States Patent
Fyke

(10) Patent No.: US 7,505,611 B2
(45) Date of Patent: Mar. 17, 2009

(54) APPARATUS AND METHOD OF INPUT AND FINGER PRINT RECOGNITION ON A HANDHELD ELECTRONIC DEVICE

(75) Inventor: Steven H. Fyke, Fort Erie (CA)

(73) Assignee: Research In Motion Limited, Waterloo, Ontario (CA)

( * ) Notice: Subject to any disclaimer, the term of this patent is extended or adjusted under 35 U.S.C. 154(b) by 727 days.

(21) Appl. No.: 10/849,928

(22) Filed: May 21, 2004

(65) Prior Publication Data

US 2005/0259851 A1    Nov. 24, 2005

(30) Foreign Application Priority Data

May 21, 2003    (GB) ................................. 0311794.2

(51) Int. Cl.
*G06K 9/00* (2006.01)

(52) U.S. Cl. ...................................... 382/124

(58) Field of Classification Search ................ 382/115, 382/124, 181, 313; 713/186; 283/68–70; 902/3
See application file for complete search history.

(56) References Cited

U.S. PATENT DOCUMENTS

| | | | |
|---|---|---|---|
| 6,219,793 B1 | 4/2001 | Li et al. | |
| 6,327,376 B1 | 12/2001 | Harkin | |
| 6,360,004 B1 * | 3/2002 | Akizuki | 382/124 |
| 6,401,551 B1 | 6/2002 | Kawahara et al. | |
| 7,020,308 B1 * | 3/2006 | Shinzaki et al. | 382/124 |
| 2002/0163601 A1 | 11/2002 | Min II et al. | |
| 2002/0180585 A1 | 12/2002 | Kim et al. | |
| 2004/0252867 A1 * | 12/2004 | Lan et al. | 382/124 |

FOREIGN PATENT DOCUMENTS

| | | |
|---|---|---|
| EP | 0973123 A1 * | 1/2000 |
| EP | 1043698 | 10/2000 |
| EP | 1257111 | 11/2002 |
| EP | 1434162 | 6/2004 |
| WO | WO01/59558 | 8/2001 |

OTHER PUBLICATIONS

Computer/machine translation of European Patent No. EP 1257111 (published on Nov. 13, 2002), pp. 1-4.*
Patent Abstracts of Japan, vol. 2000, No. 23, Feb. 10, 2001 & JP 2001 155317 A (Mitsubishi Electric Corp.), Jun. 8, 2001, abstract.

* cited by examiner

*Primary Examiner*—Daniel G. Mariam
(74) *Attorney, Agent, or Firm*—Heenan Blaikie LLP

(57) ABSTRACT

An apparatus for input and fingerprint recognition on a handheld electronic device includes (1) a touchscreen having a touch resolution portion and a fingerprint sensor distinct from the touch resolution portion; and (2) a data processor coupled to the touchscreen. The touch resolution portion has a touch resolution for detecting a touch input on the touch surface. The data processor is configured to selectively operate the fingerprint sensor in one of a fingerprint resolution mode for sensing a fingerprint on said touch surface and a touch input mode for detecting the touch input on said touch surface.

16 Claims, 5 Drawing Sheets

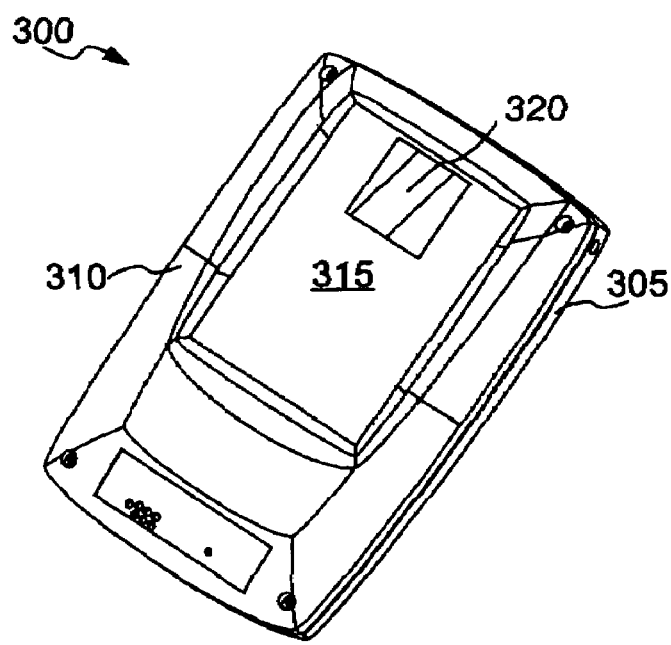
FIG. 3A
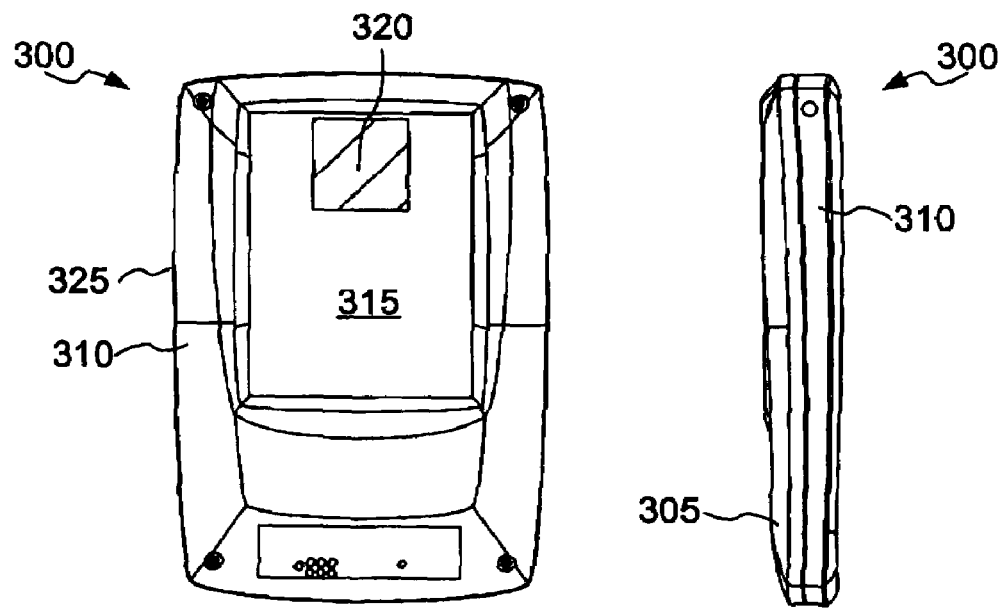
FIG. 3B
FIG. 3D
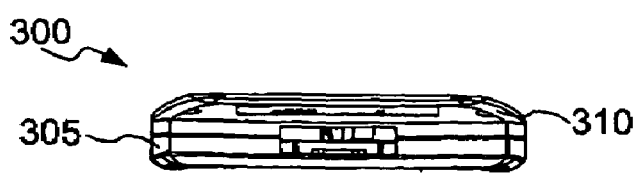
FIG. 3C

APPARATUS AND METHOD OF INPUT AND FINGER PRINT RECOGNITION ON A HANDHELD ELECTRONIC DEVICE

CROSSREFERENCE TO RELATED APPLICATION

N/A

BACKGROUND

1. Technical Field

This application relates to mobile communication techniques in general, and to an apparatus and method of input and finger print recognition on a handheld electronic device in particular.

2. Description of the Related Art

Touch pads are known techniques of computer input. A touch pad has a flat surface capable of producing a signal when the flat surface is touched with a finger.

Finger print recognition is a known technique of biometric systems, utilized for recognizing the identity of a person based on physiological characteristics.

Both techniques are typically not provided simultaneously in handheld electronic devices. Although touch pads and finger print devices are common, touch pads may have very low resolution, and may use an interpretive algorithm to increase the apparent resolution, whereas finger print devices may have very high resolution. The limited surface area of a handheld electronic device may exclude the use of both touch pads and fingerprint devices simultaneously.

SUMMARY

According to a first aspect of the invention described herein, there is provided an apparatus for input and fingerprint recognition on a handheld electronic device. The apparatus includes a housing carrying a touch surface; a touch input portion integral to the touch surface and having touch resolution for detecting a touch input thereon; and a fingerprint resolution portion integral to the touch surface and distinct from the touch input portion. The fingerprint resolution portion has a fingerprint resolution mode for sensing a fingerprint on said touch surface, and a touch input mode for detecting the touch input on said touch surface. The housing is configured for releasable attachment to the handheld electronic device.

In one implementation, the data processor is configured to detect activity at the fingerprint resolution portion as navigation data in the touch input mode, and to detect activity at the fingerprint resolution portion as fingerprint data in the fingerprint resolution mode. Also, in one implementation, in the fingerprint resolution mode, the fingerprint resolution portion is sampled at a fingerprint resolution rate that provide the fingerprint resolution portion with a resolution sufficient for sensing the fingerprint on said touch surface, and in the touch input mode, the fingerprint resolution portion is subsampled at a rate less than the fingerprint resolution rate, such that the subsample rate provides the fingerprint resolution portion with a resolution sufficient for detecting the touch input on the touch surface.

According to a second aspect of the invention described herein, there is provided a method of input and fingerprint recognition at an electronic handheld device. The method involves the steps of (1) providing a touch surface having a touch resolution portion and a fingerprint resolution portion distinct from the touch resolution portion; the touch resolution portion having a touch resolution for detecting a touch input on said touch surface; and (2) selectively operating the fingerprint resolution portion in one of a fingerprint mode for sensing a fingerprint on said touch surface and a touch input mode for detecting the touch input on said touch surface.

In one implementation, the selective operating step involves detecting activity at the fingerprint resolution portion as navigation data in the touch input mode, and detecting activity at the fingerprint resolution portion as fingerprint data in the fingerprint resolution mode. Also, in one implementation, in the fingerprint resolution mode, the fingerprint resolution portion is sampled at a fingerprint resolution rate that provide the fingerprint resolution portion with a resolution sufficient for sensing the fingerprint on said touch surface, and in the touch input mode, the fingerprint resolution portion is subsampled at a rate less than the fingerprint resolution rate, such that the subsample rate provides the fingerprint resolution portion with a resolution sufficient for detecting the touch input on the touch surface.

According to a third aspect of the invention described herein, there is provided an apparatus for input and fingerprint recognition on a handheld electronic device. The apparatus includes (1) a touchscreen having a touch resolution portion and a fingerprint sensor distinct from the touch resolution portion; and (2) a data processor coupled to the touchscreen. The touch resolution portion has a touch resolution for detecting a touch input on said touch surface. The data processor is configured to selectively operate the fingerprint sensor in one of a fingerprint resolution mode for sensing a fingerprint on said touch surface and a touch input mode for detecting the touch input on said touch surface.

According to a fourth aspect of the invention described herein, there is provided a handheld electronic device, that includes a display and a keyboard on one side of the handheld electronic device; a touchscreen having a touch resolution portion and a fingerprint sensor distinct from the touch resolution portion; and a data processor coupled to the touchscreen. The touch resolution portion has a touch resolution for detecting a touch input on the touchscreen. The data processor is configured to selectively operate the fingerprint sensor in one of a fingerprint resolution mode for sensing a fingerprint on the touchscreen and a touch input mode for detecting the touch input on the touchscreen.

In one implementation, the data processor is configured to detect activity at the fingerprint sensor as navigation data in the touch input mode, and to detect activity at the fingerprint sensor as fingerprint data in the fingerprint resolution mode. Also, the touchscreen may be disposed on a side of the handheld electronic device opposite to the that of the display Also, in one implementation, the data processor is configured to &le the fingerprint sensor in the fingerprint resolution mode at a fingerprint resolution rate that provides the fingerprint sensor with a resolution sufficient for sensing the fingerprint on said touch surface. The data processor is configured is also configured to subsample the fingerprint sensor in the touch input mode at a rate less than the fingerprint resolution rate, such that the subsample rate provides the fingerprint resolution portion with a resolution sufficient for detecting the touch input on the touch surface.

Other aspects and features of the invention described herein will become apparent to those ordinarily skilled in the art upon review of the following description of specific embodiments.

BRIEF DESCRIPTION OF THE DRAWINGS

Embodiments of the present application will now be described, by way of example only, with reference to the attached figures, wherein:

FIG. 3A is a rear perspective view of a second handheld device embodiment of an apparatus provided in accordance with the present application;

FIG. 3B is a rear elevation view of the apparatus of FIG. 3A;

FIG. 3C is a bottom elevation view of the apparatus of FIG. 3A;

FIG. 3D is a right elevation view of the apparatus of FIG. 3A;

Same reference numerals are used in different figures to denote similar elements.

DETAILED DESCRIPTION OF THE DRAWINGS

Figure 1:
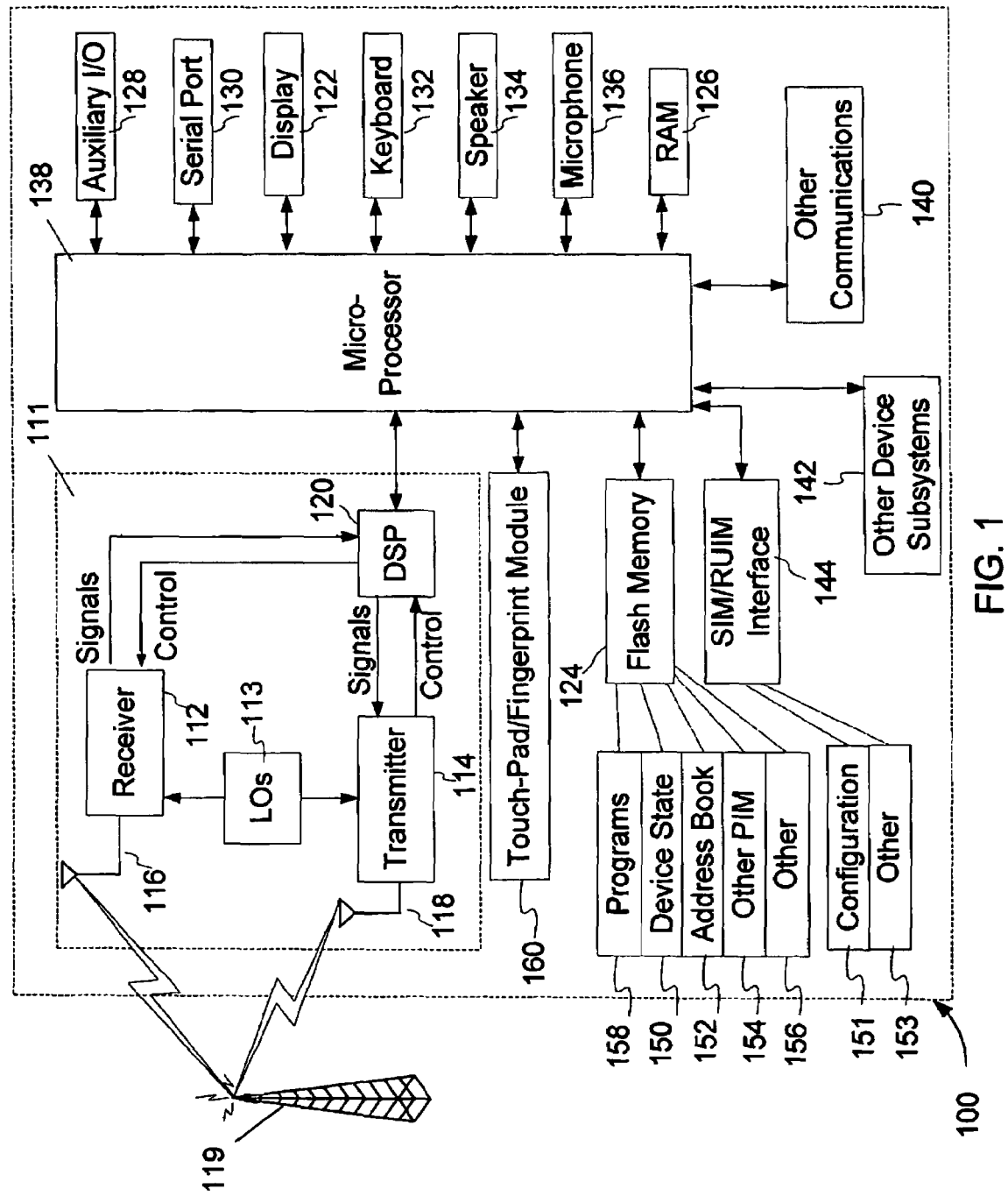
FIG. 1 is a block diagram illustrating a mobile station capable of co-operating with preferred embodiments of the apparatus and method of the current application.

Referring to the drawings, FIG. 1 is a block diagram illustrating a mobile station capable of co-operating with preferred embodiments of the apparatus and method of the current application. Mobile station 100 is preferably a two-way wireless communication device having at least voice and data communication capabilities. Mobile station 100 preferably has the capability to communicate with other computer systems on the Internet. Depending on the exact functionality provided, the wireless device may be referred to as a data massaging device, a two-way pager, a wireless e-mail device, a cellular telephone with data messaging capabilities, a wireless Internet appliance, or a data communication device, as examples.

Where mobile station 100 is enabled for two-way communication, it will incorporate a communication subsystem 111, including both a receiver 112 and a transmitter 114, as well as associated components such as one or more, preferably embedded or internal, antenna elements 116 and 118, local oscillators (LOs) 113., and a processing module such as a digital signal processor (DSP) 120. As will be apparent to those skilled in the field of communications, the particular design of the communication subsystem 111 will be dependent upon the communication network in which the device is intended to operate. For example, mobile station 100 may include a communication subsystem 111 designed to operate within the Mobitex™ mobile communication system, the DataTAC™ mobile communication system, GPRS network, UMTS network, EDGE network or CDMA network.

Network access requirements will also vary depending upon the type of network 119. For example, in the Mobitex and DataTAC networks, mobile station 100 is registered on the network using a unique identification number associated with each mobile station. In UMTS and GPRS networks, and in some CDMA networks, however, network access is associated with a subscriber or user of mobile station 100. A GPRS mobile station therefore requires a subscriber identity module (SIM) card in order to operate on a GPRS network, and a RUIM in order to operate on some CDMA networks. Without a valid SIM/RUIM card, a GPRS/UMTS/CDMA mobile station may not be fully functional. Local or non-network communication functions, as well as legally required functions (if any) such as "911" emergency calling, may be available, but mobile station 100 will be unable to carry out any other functions involving communications over the network 100. The SIM/RUIM interface 144 is normally similar to a card-slot into which a SIM/RUIM card can be inserted and ejected like a diskette or PCMCIA card. The SIM/RUIM card can have approximately 64K of memory and hold many key configuration 151, and other information 153 such as identification, and subscriber related information.

When required network registration or activation procedures have been completed, mobile station 100 may send and receive communication signals over the network 119. Signals received by antenna 116 through communication network 119 are input to receiver 112, which may perform such common receiver functions as signal amplification, frequency down conversion, filtering, channel selection and the like, and in the example system shown in FIG. 1, analog to digital (A/D) conversion. A/D conversion of a received signal allows more complex communication functions such as demodulation and decoding to be performed in the DSP 120. In a similar manner, signals to be transmitted are processed, including modulation and encoding for example, by DSP 120 and input to transmitter 114 for digital to analog conversion, frequency up conversion, filtering, amplification and transmission over the communication network 119 via antenna 118. DSP 120 not only processes communication signals, but also provides for receiver and transmitter control. For example, the gains applied to communication signals in receiver 112 and transmitter 114 may be adaptively controlled through automatic gain control algorithms implemented in DSP 120.

Mobile station 100 preferably includes a microprocessor 138 which controls the overall operation of the device. Communication functions, including at least data and voice communications, are performed through communication subsystem 111. Microprocessor 138 also interacts with further device subsystems such as the display 122, flash memory 124, random access memory (RAM) 126, auxiliary input/output (I/O) subsystems 128, serial port 130, keyboard 132, speaker 134, microphone 136, a short-range communications subsystem 140 and any other device subsystems generally designated as 142.

Some of the subsystems shown in FIG. 1 perform communication-related functions, whereas other subsystems may provide "resident" or on-device functions. Notably, some subsystems, such as keyboard 132 and display 122, for example, may be used for both communication-related functions, such as entering a text message for transmission over a communication network, and device-resident functions such as a calculator or task list.

Operating system software used by the microprocessor 138 is preferably stored in a persistent store such as flash memory 124, which may instead be a read-only memory (ROM) or similar storage element (not shown). Those skilled in the art will appreciate that the operating system, specific device applications, or parts thereof, may be temporarily loaded into a volatile memory such as RAM 126. Received communication signals may also be stored in RAM 126.

As shown, flash memory 124 can be segregated into different areas for both computer programs 158 and program data storage 150, 152, 154 and 156. These different storage types indicate that each program can allocate a portion of flash memory 124 for their own data storage requirements. Microprocessor 138, in addition to its operating system functions, preferably enables execution of software applications on the mobile station. A predetermined set of applications that control basic operations, including at least data and voice communication applications for example, will normally be installed on mobile station 100 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 119. In a preferred embodiment, the PIM data items are seamlessly integrated, synchronized and updated, via the wireless network 119, with the mobile station user's corresponding data items stored or associated with a host computer system. Further applications may also be loaded onto the mobile station 100 through the network 119, an auxiliary I/O subsystem 128, serial port 130, short-range communications subsystem 140 or any other suitable subsystem 142, and installed by a user in the RAM 126 or preferably a non-volatile store (not shown) for execution by the microprocessor 138. Such flexibility in application installation increases the functionality of the device and may provide enhanced on-device functions, communication-related functions, or both. For example, secure communication applications may enable electronic commerce functions and other such financial transactions to be performed using the mobile station 100.

In a data communication mode, a received signal such as a text message or web page download will be processed by the communication subsystem 111 and input to the microprocessor 138, which preferably further processes the received signal for output to the display 122, or alternatively to an auxiliary I/O device 128. A user of mobile station 100 may also compose data items such as email messages for example, using the keyboard 132, which is preferably a complete alphanumeric keyboard or telephone-type keypad, in conjunction with the display 122 and possibly an auxiliary I/O device 128. Such composed items may then be transmitted over a communication network through the communication subsystem 111.

For voice communications, overall operation of mobile station 100 is similar, except that received signals would preferably be output to a speaker 134 and signals for transmission would be generated by a microphone 136. Alternative voice or audio I/O subsystems, such as a voice message recording subsystem, may also be implemented on mobile station 100. Although voice or audio signal output is preferably accomplished primarily through the speaker 134, display 122 may also be used to provide an indication of the identity of a calling party, the duration of a voice call, or other voice call related information for example.

Serial port 130 in FIG. 1, would normally be implemented in a personal digital assistant (PDA)-type mobile station for which synchronization with a user's desktop computer (not shown) may be desirable, but is an optional device component. Such a port 130 would enable a user to set preferences through an external device or software application and would extend the capabilities of mobile station 100 by providing for information or software downloads to mobile station 100 other than through a wireless communication network. The alternate download path may for example be used to load an encryption key onto the device through a direct and thus reliable and trusted connection to thereby enable secure device communication.

Other communications subsystems 140, such as a short-range communications subsystem, is a further optional component which may provide for communication between mobile station 100 and different systems or devices, which need not necessarily be similar devices. For example, the subsystem 140 may include an infrared device and associated circuits and components or a Bluetooth™ communication module to provide for communication with similarly enabled systems and devices.

When used in co-operation with the apparatus and method provided according to the present application, Touch-pad/fingerprint module 160 includes software instructions that enable microprocessor 138 to carry out the various acts that are described below with reference to the remaining figures.

Figure 2A:
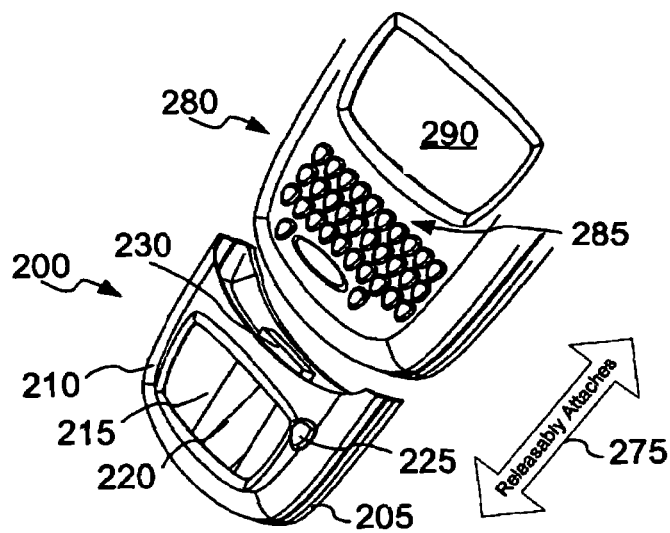
FIG. 2A is a front perspective view of a first peripheral embodiment of an apparatus provided in accordance with the present application.

Turning now to FIG. 2A, FIG. 2A is a front perspective view of a first peripheral embodiment of an apparatus provided in accordance with the present application. A combined touch-pad/fingerprint peripheral 200 is provided to releasably attach along arrow 275 to a handheld electronic device 280. When attached to device 280, peripheral 200 enables a user to provide input and preferably control device 280 via peripheral 200. When detached from device 200, peripheral 200 may conveniently be stowed away. Depending on the particular handheld electronic device, device 280 can include a keyboard 285 and display 290. Peripheral 200 includes a rear face 205, a front face 210, a touch surface 215 having an integral fingerprint portion 220, as well as optional escape key 225, and communication interface 230.

Several features of the peripheral embodiment are a function of the specific device to which it releasably attaches. In the case of the exemplary peripheral 200 and exemplary device 280 of FIG. 2A, the shape and dimensions of rear face 205, front face 210, touch surface 215, and optional escape key 225 are preferably shaped and dimensioned in analogy to features of device 280. The combined thickness of rear face 205 and front face 210 is preferably the same as the thickness of device 280. The width of rear face 205 and front face 210 is preferably the same as the width of device 280. The general shape of peripheral 200 is analogous to the lower portion of device 280 so that the top face of peripheral 200 is designed to mate with the bottom face of device 280 and so that the bottom face of peripheral 200 is analogous to the bottom face of device 280. The general shape of touch surface 215 as viewed thru the front face 210 is analogous to screen 290 of device 280. The shape and size of escape key 225 (if provided) is analogous to the shape of the keys in keyboard 285 of device 280.

Figure 2B:
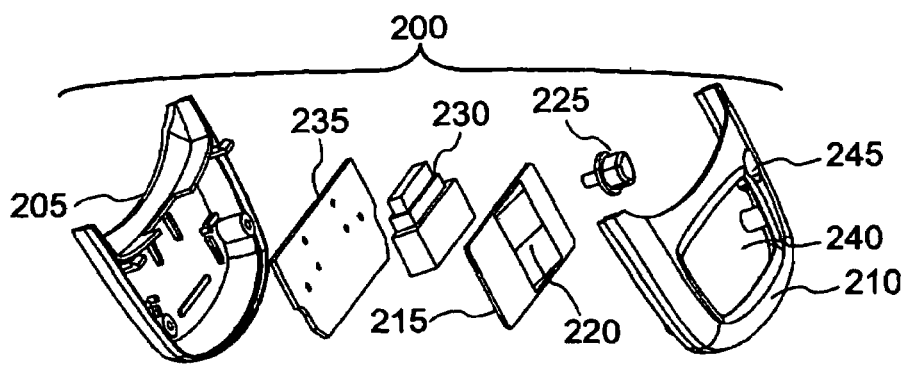
FIG. 2B is an exploded front perspective view of the apparatus of FIG. 2A.

Turning now to FIG. 2B, FIG. 2B is an exploded front perspective view of the apparatus of FIG. 2A. A traversal from the rear face 205 to the front face 210 reveals additional features of peripheral 200. The rear face 205 supports a PCB (Printed Circuit Board) 235. Onto the PCB 235 is affixed communication interface 230 and touch surface 215 having fingerprint portion 220, as well as any other electronic components required such as a processor. Escape key 225 mates with an opening in front face 210 and is supported by the PCB 235 whereat a key sensor is affixed. The front surface 210 includes escape key hole 245 and touch surface port 240 which exposes portions of the escape key 225 and portions of the touch surface 215 respectively, the remaining portions and integral components of peripheral 200 housed by the assembly of front face 210 and rear face 205.

Figure 2D:
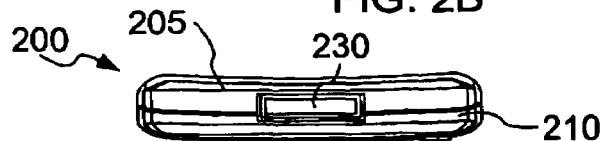
FIG. 2D is a top elevation view of the apparatus of FIG. 2A.
Figure 2C:
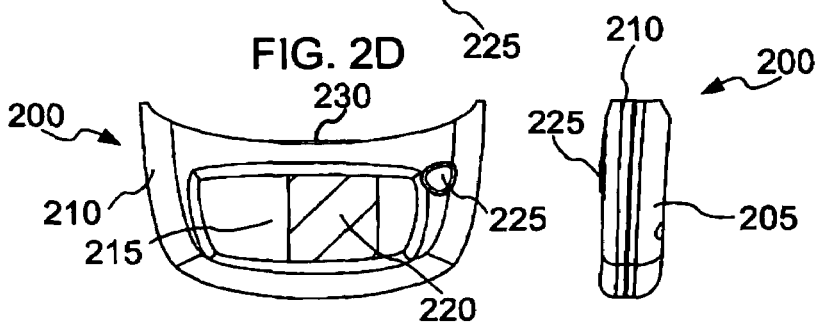
FIG. 2C is a front elevation view of the apparatus of FIG. 2A.

Turning now to FIG. 2C, FIG. 2C is a front elevation view of the apparatus of FIG. 2A. In addition to providing a communications path between peripheral 200 and device 280, communication interface 230 also serves to support the peripheral 200 onto the device 280. Communication interface 230 is preferably dimensioned and positioned on peripheral 200 so that when peripheral 200 is attached to device 280, a mating fit is achieved between the bottom surface of device 280 and the top surface of peripheral 200. The dimensions of fingerprint portion 220 are preferably at least as big as the size of a human fingerprint.

Turning now to FIG. 2D, FIG. 2D is a top elevation view of the apparatus of FIG. 2A. Communication interface 230 is provided on the top face of peripheral 200 to connect to a receiving interface (not shown) on the bottom face of device 280 thereby enabling a communication path to exist between device 280 and peripheral 200 when the peripheral is releasably attached to device 280, as well as achieving a mating fit of peripheral 200 with device 280 and providing structural support for peripheral 200 onto device 280.

Figure 2F:
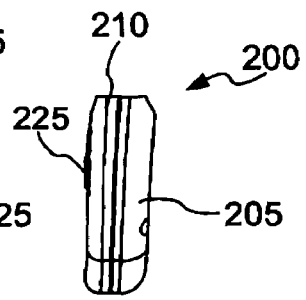
FIG. 2F is a right elevation view of the apparatus of FIG. 2A.
Figure 2E:
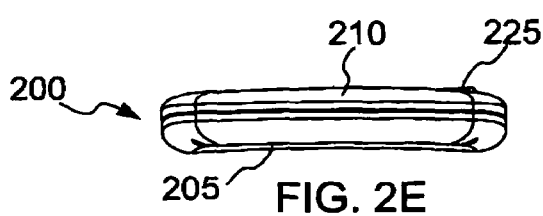
FIG. 2E is a bottom elevation view of the apparatus of FIG. 2A.

Turning now to FIG. 2E, FIG. 2E is a bottom elevation view of the apparatus of FIG. 2A. Although not expressly shown, peripheral 200 can optionally be provided with a "pass-thru" communication interface on it's bottom face, and if so provided the "pass-thru" communication interface which is preferably analogous to the receiving interface on the device 280 so that the device and peripheral combination continues to posses an available communication interface while the peripheral 200 is releasably attached to the device 280.

Turning now to FIG. 2F, FIG. 2F is a right elevation view of the apparatus of FIG. 2A. The combined thickness of rear face 205 and front face 210 is preferably the same as the thickness of device 280.

Turning now to FIG. 3A, FIG. 3A is a rear perspective view of a second handheld device embodiment of an apparatus provided in accordance with the present application. A combined touch-pad/fingerprint is provided integral to handheld electronic device 300. Touch surface 315 and fingerprint portion 320 enable a user to provide input to and preferably control device 300. Preferably, touch surface 315 and fingerprint portion 320 are provided on the rear face 310 of device 300 so that the surface area of front face 305 can provide a more traditional user interface such as a screen and/or keyboard (not shown). Operationally, the user of device 300 can operate touch surface 315 and fingerprint portion 320 with one or more fingers of the hand which holds device 300, for instance by supporting the lower portion of rear face 310 in the palm while viewing front face 305 so as to allow at least one finger to access touch surface 315 and fingerprint portion 320.

Turning now to FIG. 3B, FIG. 3B is a rear elevation view of the apparatus of FIG. 3A. Fingerprint portion 320 is preferably disposed near the top of touch surface 315, while touch surface 315 is preferably disposed near the top of rear face 310. This arrangement facilitates support of the device 300 by placement of the lower portion of rear face 310 in the palm while allowing at least one finger access to touch surface 315 and fingerprint portion 320. An optional escape key 325 is also provided.

Turning now to FIGS. 3C and 3D, FIG. 3C is a bottom elevation view of the apparatus of FIG. 3A while FIG. 3D is a right elevation view of the apparatus of FIG. 3A. From these vantage points, neither the touch surface 315 nor the fingerprint portion 320 can be seen advantageously ensuring that the profile of device 300 remains substantially the same as if it were not provided with these features, thereby allowing for device 300 to continue to be employed with existing peripherals, docking cradles, holsters, etc. traditionally co-operating with device 300.

Figure 4C:
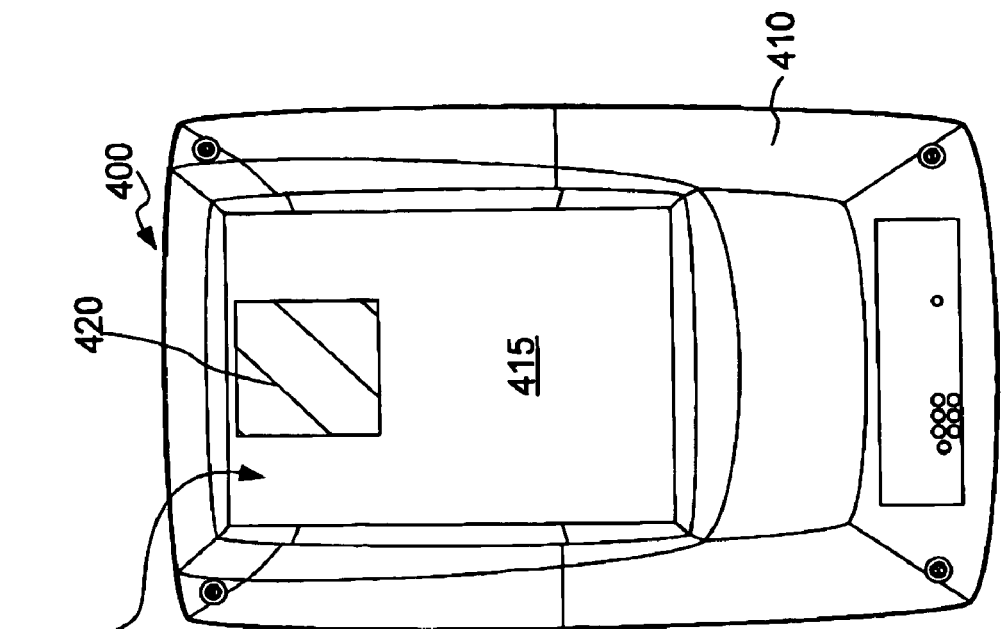
FIG. 4C is a rear elevation view of the apparatus of FIG. 4A.
Figure 4B:
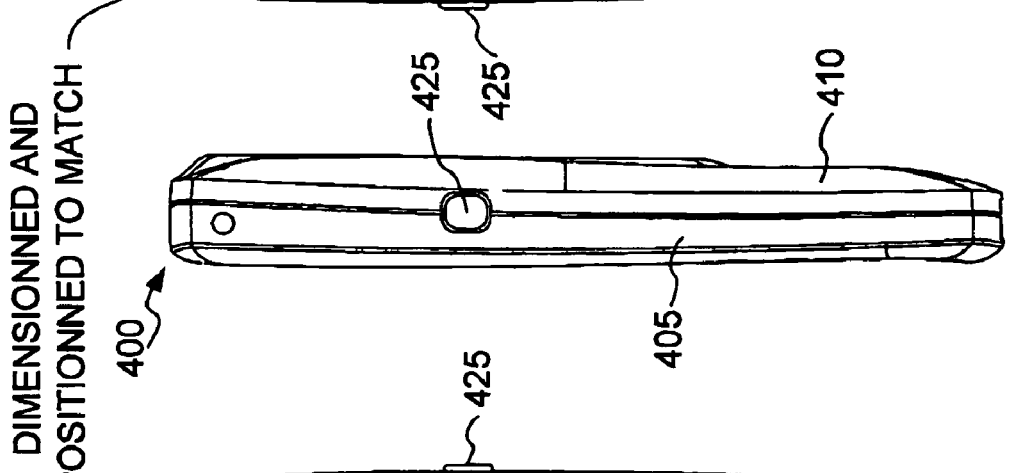
FIG. 4B is a right elevation view of the apparatus of FIG. 4A.
Figure 4A:
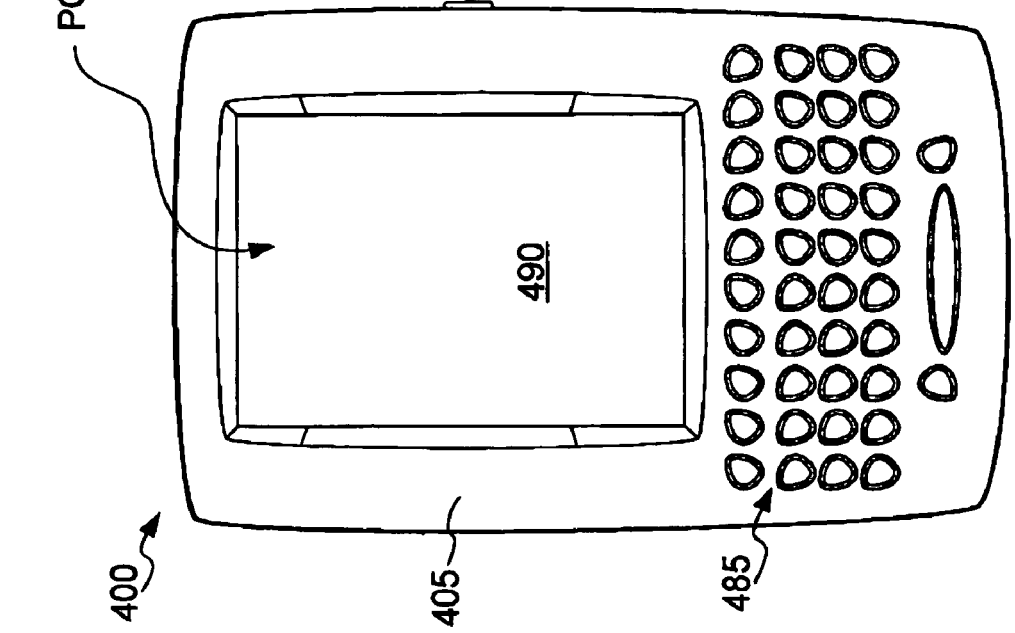
FIG. 4A is a top elevation view of a third handheld device embodiment of an apparatus provided in accordance with the present application.

Turning now to FIG. 4A, FIG. 4A is a top elevation view of a third handheld device embodiment of an apparatus provided in accordance with the present application. A combined touch-pad/fingerprint is provided integral to handheld electronic device 400. Advantageously, the combined touch-pad/fingerprint is not visible on the front face 405 of handheld device 400 so that screen 490 is contemporaneously entirely visible while the touch-pad/fingerprint surface is manipulated. Device 400 is provided with an optional keyboard 485 and optional escape key 425.

Turning now to FIG. 4B, FIG. 4B is a tight elevation view of the apparatus of FIG. 4A. From this vantage point, neither the touch surface 415 nor the fingerprint portion 420 can be seen advantageously ensuring that the profile of device 400 remains substantially the same as if it were not provided with these features, thereby allowing for device 400 to continue to be employed with existing peripherals, docking cradles, holsters, etc. Traditionally co-operating with device 300.

Turning now to FIG. 4C, FIG. 4C is a rear elevation view of the apparatus of FIG. 4A. Touch surface 415 and fingerprint portion 420 enable a user to provide input to and preferably control device 300. Preferably, touch surface 415 and fingerprint portion 420 are provided on the rear face 410 of device 400 so that the surface area of front face 405 can provide a more traditional user interface including a screen 405 and keyboard 495. Preferably, touch surface 415 is dimensioned and sized to match screen 490. Operationally, the user of device 400 can operate touch surface 415 and fingerprint portion 420 with one or more fingers of the hand which holds device 300, for instance by supporting the lower portion of rear face 410 in the palm while viewing front face 405 so as to allow at least one finger to access touch surface 415 and fingerprint portion 420. Advantageously, screen 490 remains unobstructed during these manipulations.

Figure 5:
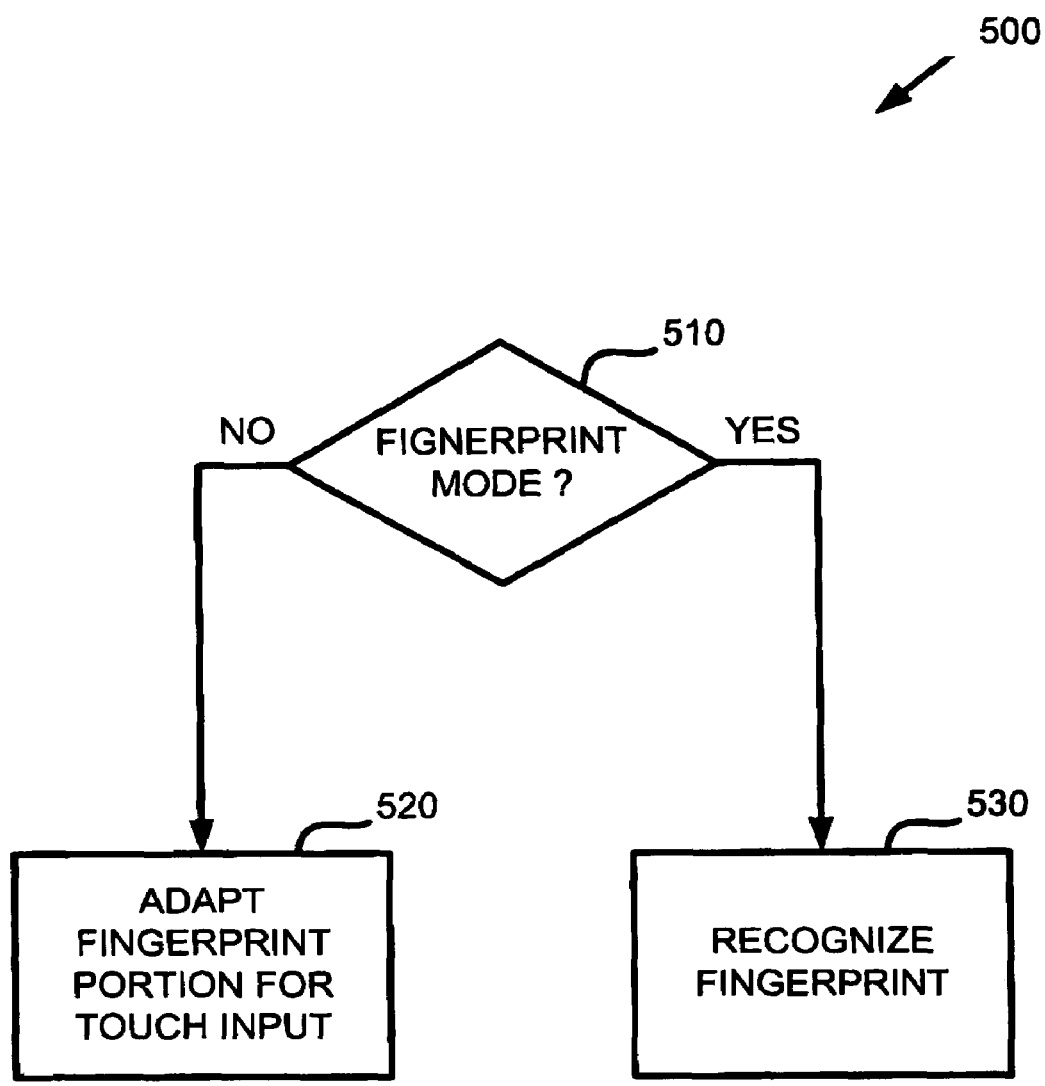
FIG. 5 is a flow chart illustrating an embodiment of a method provided in accordance with the present application.

Referring now to FIG. 5, FIG. 5 is a flow chart illustrating an embodiment of a method provided in accordance with the present application.

Referring to flow-chart 500, at step 510 the method determines if the fingerprint portion is to be used in fingerprint mode, or for touch input. If fingerprint mode is determined at step 510, then at step 520 the fingerprint portion is used to recognize a fingerprint. However, if fingerprint mode is not determined at step 510, then at step 530 the fingerprint portion is adapted for touch input, for example by sub-sampling the higher resolution fingerprint mode so that it is operated at a resolution which is comparable to the remaining portion of the touch surface.

The above-described embodiments of the present application are intended to be examples only. Those of skill in the art may effect alterations, modifications and variations to the particular embodiments without departing from the scope of the application.

I claim:

1. A method of input and fingerprint recognition at an electronic handheld device, the method comprising the steps of:
   providing a touch surface having a touch resolution portion and a fingerprint resolution portion distinct from the touch resolution portion, the touch resolution portion and the fingerprint resolution portion being integral to said touch surface, and the touch resolution portion having a touch resolution for detecting a touch input on said touch surface; and
   selectively operating the fingerprint resolution portion in one of a fingerprint mode for sensing a fingerprint on said touch surface and a touch input mode for detecting the touch input on said touch surface.

2. The method according to claim 1, wherein the selective operating step comprises detecting activity at the fingerprint resolution portion as navigation data in the touch input mode, and detecting activity at the fingerprint resolution portion as fingerprint data in the fingerprint resolution mode.

3. The method according to claim 2, wherein in said fingerprint mode the fingerprint resolution portion is sampled at a fingerprint resolution rate providing the fingerprint resolution portion with a resolution sufficient for sensing the fingerprint on said touch surface, and in said touch input mode the fingerprint resolution portion is subsampled at a rate less than the fingerprint resolution rate, said subsample rate providing the fingerprint resolution portion with a resolution sufficient for detecting the touch input on said touch surface.

4. The method according to claim 3, further comprising the step of recognizing the fingerprint on the fingerprint resolution portion in the fingerprint mode.

5. An apparatus for input and fingerprint recognition on a handheld electronic device, the apparatus comprising:
   a touch surface having a touch resolution portion and a fingerprint resolution portion distinct from the touch resolution portion, the touch resolution portion and the fingerprint resolution portion being integral to said touch surface, the touch resolution portion having a touch resolution for detecting a touch input on said touch surface; and
   a data processor coupled to the touch surface and being configured to selectively operate the fingerprint resolution portion in one of a fingerprint resolution mode for sensing a fingerprint on said touch surface and a touch input mode for detecting the touch input on said touch surface.

6. The apparatus according to claim 5, wherein the data processor is configured to detect activity at the fingerprint resolution portion as navigation data in the touch input mode, and to detect activity at the fingerprint resolution portion as fingerprint data in the fingerprint resolution mode.

7. The apparatus according to claim 6, wherein the data processor is configured to sample the fingerprint resolution portion in said fingerprint resolution mode at a fingerprint resolution rate providing the fingerprint resolution portion with a fingerprint resolution for sensing the fingerprint on said touch surface, the data processor being further configured to subsample the fingerprint resolution portion in said touch input mode at a rate less than the fingerprint resolution rate, the subsample rate providing the fingerprint resolution portion with a resolution sufficient for detecting the touch input on said touch surface.

8. The apparatus according to claim 7, further comprising a housing, the touch surface and the data processor being disposed within the housing, the housing being configured for releasable attachment to the handheld electronic device.

9. The apparatus according to claim 8, wherein the housing has a communication interface at one end thereof for interfacing with the handheld electronic device.

10. The apparatus according to claim 9, wherein tile, the housing has a shape corresponding to that of the handheld electronic device.

11. The apparatus according to claim 10, wherein the handheld electronic device includes a display screen on one side thereof, and the touch surface corresponds in shape to the display screen.

12. A handheld electronic device, comprising:
   a display screen;
   a keyboard;
   a touch surface having a touch resolution portion and a fingerprint resolution portion distinct from the touch resolution portion, the touch resolution portion and the fingerprint resolution portion being integral to said touch surface, the touch resolution portion having a touch resolution for detecting a touch input on said touch surface; and
   a data processor coupled to the display screen, the keyboard and the touch surface and being configured to selectively operate the fingerprint resolution portion in one of a fingerprint resolution mode for sensing a fingerprint on said touch surface and a touch input mode for detecting the touch input on said touch surface.

13. The handheld electronic device according to claim 12, wherein the data processor is configured to detect activity at the fingerprint resolution portion as navigation data in the touch input mode, and to detect activity at the fingerprint sensor resolution portion as fingerprint data in the fingerprint resolution mode.

14. The handheld electronic device according to claim 13, wherein the display screen and the keyboard are disposed on one side of the handheld electronic device, and the touch surface is disposed on a side of the handheld electronic device opposite to the one side.

15. The handheld electronic device according to claim 14, wherein the data processor is configured to sample the fingerprint resolution portion in said fingerprint resolution mode at a fingerprint resolution rate providing the fingerprint resolution portion with a fingerprint resolution for sensing the fingerprint on said touch surface, the data processor being further configured to subsample the fingerprint resolution portion in said touch input mode at a rate less than the fingerprint resolution rate, the subsample rate providing the fingerprint resolution portion with a resolution sufficient for detecting the touch input on said touch surface.

16. The handheld electronic device according to claim 15, wherein the handheld electronic device is a wireless device.

* * * * *